United States Patent [19]
Aucsmith

[11] Patent Number: 5,936,226
[45] Date of Patent: Aug. 10, 1999

[54] MASS STORAGE DEVICE ADAPTER FOR SMART CARDS

[75] Inventor: David Aucsmith, Portland, Oreg.

[73] Assignee: Intel Corporation, Santa Clara, Calif.

[21] Appl. No.: 08/857,624

[22] Filed: May 20, 1997

Related U.S. Application Data

[62] Division of application No. 08/534,570, Sep. 27, 1995, Pat. No. 5,663,553.

[51] Int. Cl.$^6$ ....................................................... G06K 19/06
[52] U.S. Cl. ............................................ 235/492; 235/487
[58] Field of Search ...................................... 235/492, 487

[56] References Cited

U.S. PATENT DOCUMENTS

| | | |
|---|---|---|
| 4,656,533 | 4/1987 | Sakai et al. . |
| 5,159,182 | 10/1992 | Eisele . |
| 5,204,663 | 4/1993 | Lee . |
| 5,276,317 | 1/1994 | Ozouf et al. . |
| 5,296,692 | 3/1994 | Shino . |
| 5,338,923 | 8/1994 | Grieu . |
| 5,457,590 | 10/1995 | Barrett et al. . |
| 5,471,038 | 11/1995 | Eisele . |
| 5,486,687 | 1/1996 | LeRoux . |
| 5,584,043 | 12/1996 | Burkart . |
| 5,663,553 | 9/1997 | Aucsmith ................................ 235/492 |

OTHER PUBLICATIONS

Fisher International Systems and Toshiba Form New Company, Strategic Partnership (Fischer International, Mar. 2, 1998).

Turn Your PC's Floppy Drive into a Smart Card Reader, brochure, (Fischer International, 1996).

Smarty (Fischer International 1997).

*Primary Examiner*—Harold I. Pitts
*Attorney, Agent, or Firm*—Blakely, Sokoloff, Taylor & Zafman

[57] ABSTRACT

A device for transferring data between a data processing machine and a smart card is provided. The data processing machine has a drive for receiving a removable storage unit and for reading and writing data from and to said removable storage unit. The device for transferring data between a data processing machine and a smart card includes a housing insertable into the drive. The housing has a recess for receiving a smart card. The device for transferring data further includes a logic circuit, disposed within the housing, for transferring data between the data processing machine and the smart card.

20 Claims, 5 Drawing Sheets

MASS STORAGE DEVICE ADAPTER FOR SMART CARDS

REFERENCE TO RELATED APPLICATION

This application is a division of Ser. No. 08/534,570, Sep. 27, 1995, now U.S. Pat. No. 5,663,553.

BACKGROUND OF THE INVENTION

(1) Field of the Invention

This invention generally relates to interfacing a smart card with a data processing machine such as a personal computer. More specifically, this invention relates to a device for transferring data between a smart card and a data processing machine such as a personal computer via a standard disk or cassette drive.

(2) Prior Art

Smart cards are generally known in the art. These cards have physical dimensions substantially similar to the dimensions of the well-known magnetic-strip bank cards and typically incorporate one or more built-in integrated circuits. Additionally, smart cards generally have built-in contact pads, connected to the built-in integrated circuit, for interacting with a smart card reader. The built-in integrated circuit can be a microprocessor and a memory, a logic circuit and a memory, or just a memory. One of the advantages of smart cards over magnetic strip cards is that smart cards can be programmed and reprogrammed and, thus, can be reused.

It would be useful to use smart cards in conjunction with a data processing machine such as a personal computer, for example. The personal computer could be used, for example, for programming or reprogramming the smart card as well as for retrieving information from the smart card. However, due to structural and functional differences between smart cards and other conventional removable storage devices, such as floppy disks or magnetic tape cassettes, smart cards cannot be directly interfaced with conventional read/write devices such as disk or cassette drives.

Presently, a special interface is required between the data processing machine and the smart card. Current architecture for personal computers allows for interfacing smart cards with personal computers via a dedicated ISO 7816 Smart Card reader/writer device or a Personal Computer Memory Card International Association (PCMCIA) adapter. However, these devices constitute additional overhead because most of the existent computers are not provided with these type of devices. While typically personal computers are equipped with either a disk drive or cassette drive, due to the above-mentioned differences between standard removable storage devices and ISO 7816 Smart Cards, the existent drives of personal computers are not equipped for reading ISO 7816 smart cards.

It is, thus, desirable to interface smart cards with personal computers without changing the current personal computer hardware configuration. Moreover, it is desirable to provide the capability of using conventional disk or cassette drives, as already existing in personal computers, for reading or writing data from and to standard smart cards.

SUMMARY OF THE INVENTION

The present invention provides for a device for transferring data between a data processing machine and a smart card. The data processing machine has a drive for receiving a removable storage unit and for exchanging data with the removable storage unit. The device for transferring data between a data processing machine and a smart card includes a housing insertable into the drive. The housing has a recess, for receiving a smart card and for supporting the smart card when the housing is inserted into the drive. The device for transferring data further includes a logic circuit for transferring data between the data processing machine and the smart card.

According to one embodiment of the present invention, the device for transferring data between a data processing machine and a smart card may include a housing insertable into a floppy disk drive of the data processing machine, the housing having a top surface, a backside surface with an opening, and an inner surface defining a cavity for receiving a smart card therein via said opening. The inner surface has a snap-fit card contact for operatively connecting the smart card to the device for transferring data via a contact of the smart card and for releasably retaining the smart card into the cavity. The device for transferring data further has an interface unit for transferring data between the data processing machine and the smart card. The interface unit has first and second driver units, first and second control logic units, a memory device, a battery, and a magnetic transducer. The first driver unit is coupled to the snap-fit card contact. The first and second control logic units are coupled respectively to the first and second driver units. The memory device is coupled to the first and second control logic units. The battery is coupled to the first and second driver units. The magnetic transducer is coupled to the first and second driver units. The magnetic transducer exchanges magnetic signals between the data processing machine and the smart card.

The present invention also provides a method for transferring data between a smart card and a data processing machine. The method includes the steps of:

providing a casing insertable into a drive of the data processing machine; providing a recess into the casing for receiving and supporting a smart card; providing an interface, onto the casing, for exchanging data between a smart card and the data processing machine; inserting a smart card into the recess of the casing; inserting the casing into the drive of the data processing machine; generating a drive read or a drive write signal; and responsive to the drive read or drive write signal accessing the smart card via the drive.

BRIEF DESCRIPTION OF THE DRAWINGS

The above and other objects, features and advantages of the present invention will be apparent from the following detailed description of the invention explained with reference to the accompanying drawings, in which.

DETAILED DESCRIPTION OF THE INVENTION

In the following description, numerous specific details are set forth to provide a thorough understanding of the present invention. However, one having ordinary skills in the art may be able to practice the invention without these specific details. In some instances, well-known circuits, structures, and techniques have not been shown in detail not to unnecessarily obscure the present invention.

Figure 1:
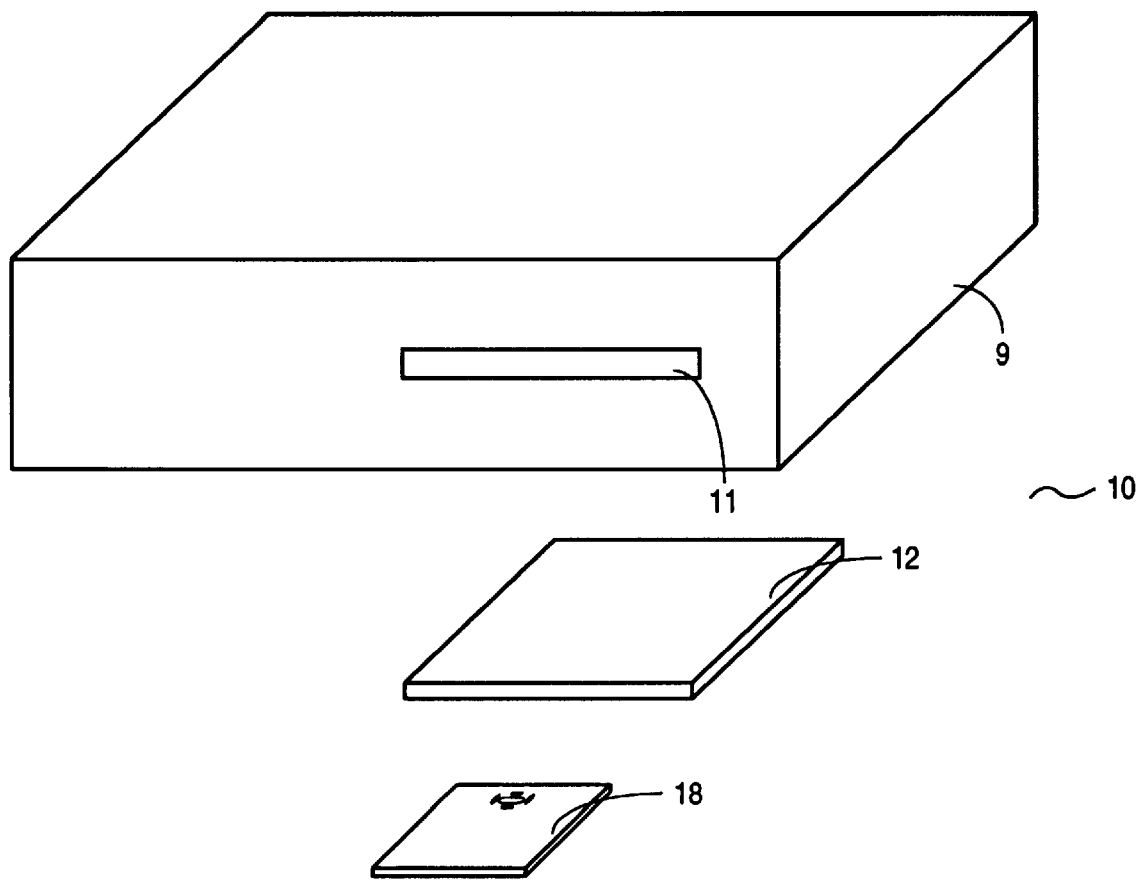
FIG. 1 illustrates a prior art personal computer with a standard drive, a standard removable storage device, and a standard smart card.

FIG. 1 shows a prior art configuration including a data processing machine 9, a removable storage device 12, and a smart card 18. The data processing machine, can be a personal computer, by way of non-limiting example. This data processing machine includes the drive 11 which, by way of non-limiting example, can be a 3+e,fra 12+ee -inch floppy disk drive. The removable storage device 12 in this particular example is a 3½-inch floppy disk. As one can see from this figure, the dimensions and the structure of the standard disk drive 11 are not adequate to fit and operatively engage the smart card 18. Consequently, smart card 18 cannot be interfaced with the personal computer 9 for transferring data between the personal computer and the card. A standard ISO 7816 smart card adapter would be required to be installed on the personal computer.

Figure 2:
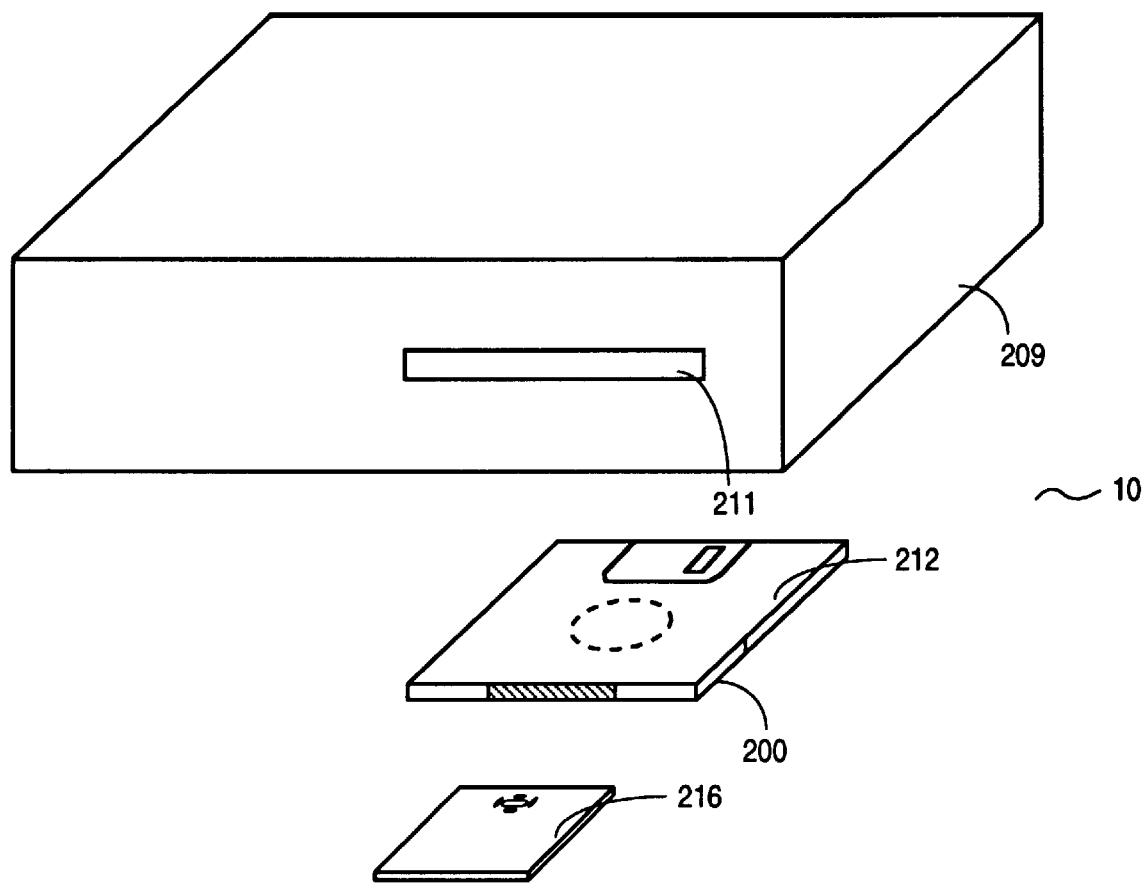
FIG. 2 shows an embodiment of the device for transferring data according to the present invention, a data processing machine, and a smart card.

FIG. 2 shows an embodiment according to the present invention. The embodiment according to the present invention 200 includes a housing 212 insertable into a disk or a cassette drive 211 of a data processing machine 209. In this particular example, by way of non-limiting example, the drive 211 is a conventional 3½-inch disk drive. The drive typically reads and writes data from and to a removable storage unit, such as a 3½-inch floppy disk, in this particular example. Accordingly, the housing 212 of the device for transferring data emulates the case of a 3½-inch floppy disk, by way of non-limiting example. The housing can be inserted into the drive 211, thus, providing an interface for fitting and operatively engaging the smart card 216 with the data processing machine 209.

Figure 3:
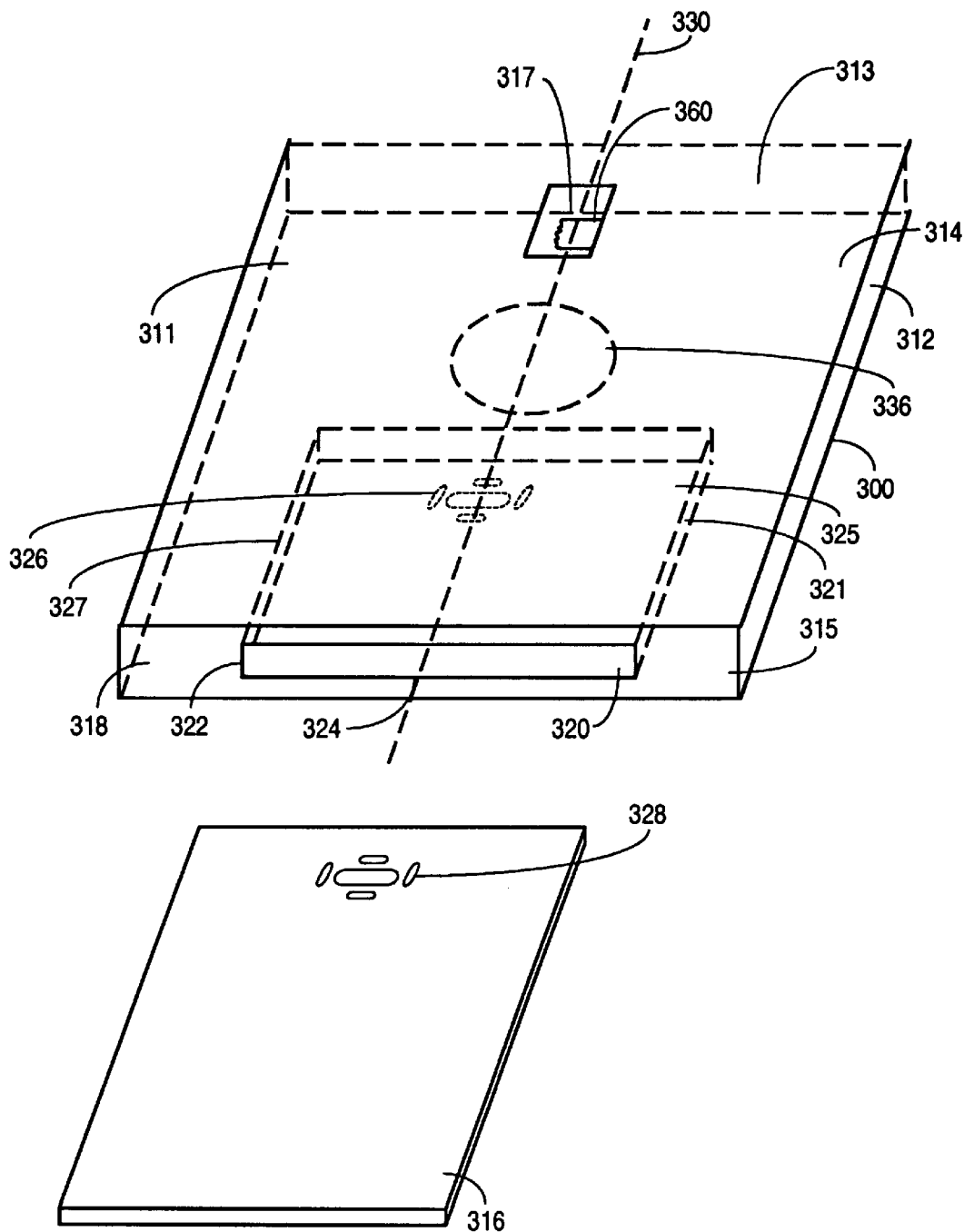
FIG. 3 shows a detailed embodiment of the device for transferring data according to the present invention and a smart card.

FIG. 3 shows a preferred embodiment according to the present invention. This embodiment includes the device 300 for transferring data between a smart card and a data processing machine (not shown). The device 300 for transferring data, according to the present invention, has a housing 312 emulating the casing of a 3½-inch floppy disk. The housing 312 can be made of any material that offers protection, to the inner structures that may be contained within the housing, against mechanical, electrical, or any other type of injurious contact. By way of example, the housing material can be identical with the material of which the conventional floppy disk case is made.

The housing 312 has a top surface 314 and a bottom surface 311. The bottom surface of the housing 312 has a spindle 336 (phantom lines) which has substantially the same size as the spindle of a regular 3½-inch floppy disk. This spindle serves the purpose of emulating the spindle of a 3½ floppy disk. The top surface 314 has an aperture 317. In this particular embodiment, by way of non-limiting example, the aperture 317 is a rectangular slot emulating the rectangular slot located on the top surface of the case of a conventional 3½-inch floppy disk. However, in another embodiment according to the present invention, aperture 317 could have a different shape, as long as a device for reading or writing information, such as the read and the write heads of the data processing machine, can read and write information via this aperture. When the device 300 is inserted into a drive (not shown) of a data processing machine (not shown), the aperture 317 faces a read/write unit (not shown) including a read/write head (not shown) of the data processing machine. The aperture 317 serves the purpose of passing magnetic signals between the device for transferring data and the read/write unit of the data processing machine.

The housing 312 of the device for transferring data, further, has a front end 313 and a back end 315. The front end is the end of the housing closer to the disk or cassette drive (not shown) of the data processing machine (not shown), when the device for transferring data is inserted, or on the way to be inserted, into the disk or cassette drive. At the back end 315 of the housing, the housing includes a back side surface 318 positioned between the top and bottom surfaces of the housing. The back side surface 318 has an opening 320. The housing further has a receiving surface 325 (defined by phantom lines) which defines a card recess or cavity 321 for receiving a smart card. A smart disk can be inserted into the card recess via opening 320. The opening 320, in this preferred embodiment, has a rectangular shape with a height 322 and a width 324. The height of the opening is sized so that it is substantially equal or larger than the height (thickness) of a standard ISO 7816 smart card. The width 324 is similarly sized so it will be substantially equal or larger than the width of a standard ISO 7816 smart card. Accordingly, a standard ISO 7816 smart card can be inserted into the housing via the opening 320.

The card recess 321 extends longitudinally, with respect to longitudinal axis 330, from the opening 320 towards the front end 313 of the housing. By way of non-limiting example, the recess 321 has a substantially paralelipipedical shape. The recess has a length 327, a width 324, substantially equal to the width of the smart card 316, and a height 322, substantially equal to the thickness of smart card 316. While it is preferable that the length 327 be shorter than the length of the card, the length of the recess 321 could be larger than the length of the card provided that a portion of the rear part of the smart card sticks out of the housing when the card is inserted all the way into the card recess 321. This is to allow manual insertion and removal of the smart card into and outside of the housing 312.

The card recess 321, in this particular embodiment, is designed in a manner such that, upon insertion of smart card 316 therein, smart card 316 can fit and operatively engage with the device for transferring data 300. The receiving surface 325 includes a card interface contact 326 (shown in phantom lines) for operatively connecting the smart card to the device for transferring data. In this particular embodiment, the frictional engagement of the card interface contact 326 with the card contact pads 328 of the card 316 causes the closing of an electrical path. Signals can, thus, be exchanged between the device and the card. Similarly, power can be supplied from the device to the card via card interface contact 326.

The card interface contact can include a deflectable resilient contact such that upon insertion of the smart card into the recess 321, the smart card is captured between the deflectable resilient card interface contact, and the wall opposite the wall on which the card interface contact is located. The smart card 316 and the device for transferring data can, thus, be locked in retaining engagement. In this way, the device for transferring data provides support to the smart card when the device for transferring data is inserted into the drive. The engagement between the card interface contact 326 and the card contact 328 is not limited to frictional engagement. Such engagement could be magnetic, for example. Moreover, the frictional engagement of the contact pads 328 with the card interface contact 326 provides an electrical interconnection between the smart card 316 and the device for transferring data 300. While in this particular embodiment, an electrical interconnection is established, interconnections other than electrical can be envisioned depending on the type of storage and/or processing means that a card would utilize. A magnetic coil 360 connected to a magnetic transducer (not shown), by way of non-limiting example, can be responsible for the transfer of magnetic data between the device for transferring data and the read/write heads. This magnetic coil 360 can be positioned within the area defined by the parameter of aperture 317.

Figure 4:
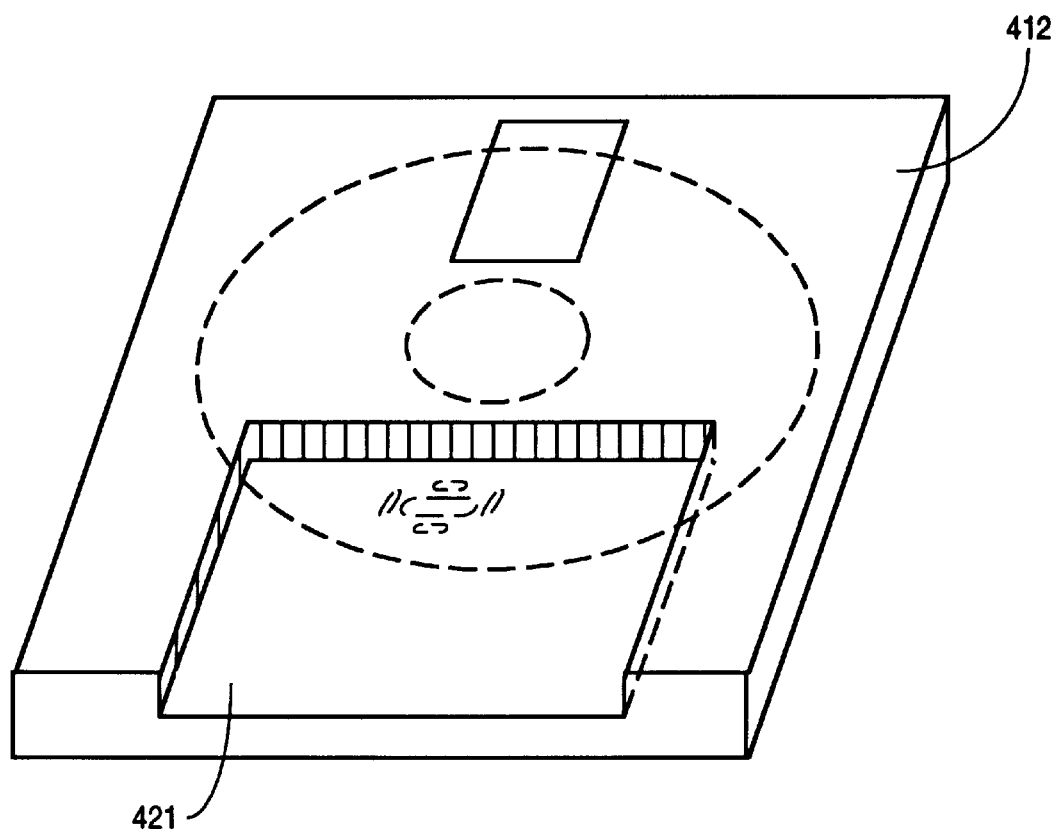
FIG. 4 shows an alternative embodiment of the device for transferring data according to the present invention.

FIG. 4 illustrates another embodiment according to the present invention. This embodiment incorporates by reference the features explained in conjunction with the embodiment illustrated in FIG. 3 with the following exceptions described below in this paragraph. In this embodiment, the card is received by a recess 421 having a substantially square U-shaped cross-section. In this embodiment, the recess 421 is not limited by the top surface of the housing. As a result, the amount of space that would otherwise be occupied by the top surface of the parallelepiped, defining recess 321, is saved. Accordingly, more circuitry could be fitted inside the housing. This embodiment could also include a conventional magnetic disk (phantom lines) positioned beneath the recess 421. As such, this embodiment could be used in conjunction with both a magnetic disk and a smart card. The housing 412 could be configured to provide the means for transferring data from both the magnetic disk and the smart card. The retention of the smart card within the recess, in this case, could be provided, by way of non-limiting example, by a magnetic contact positioned on the surface located at the bottom of the recess.

Figure 5:
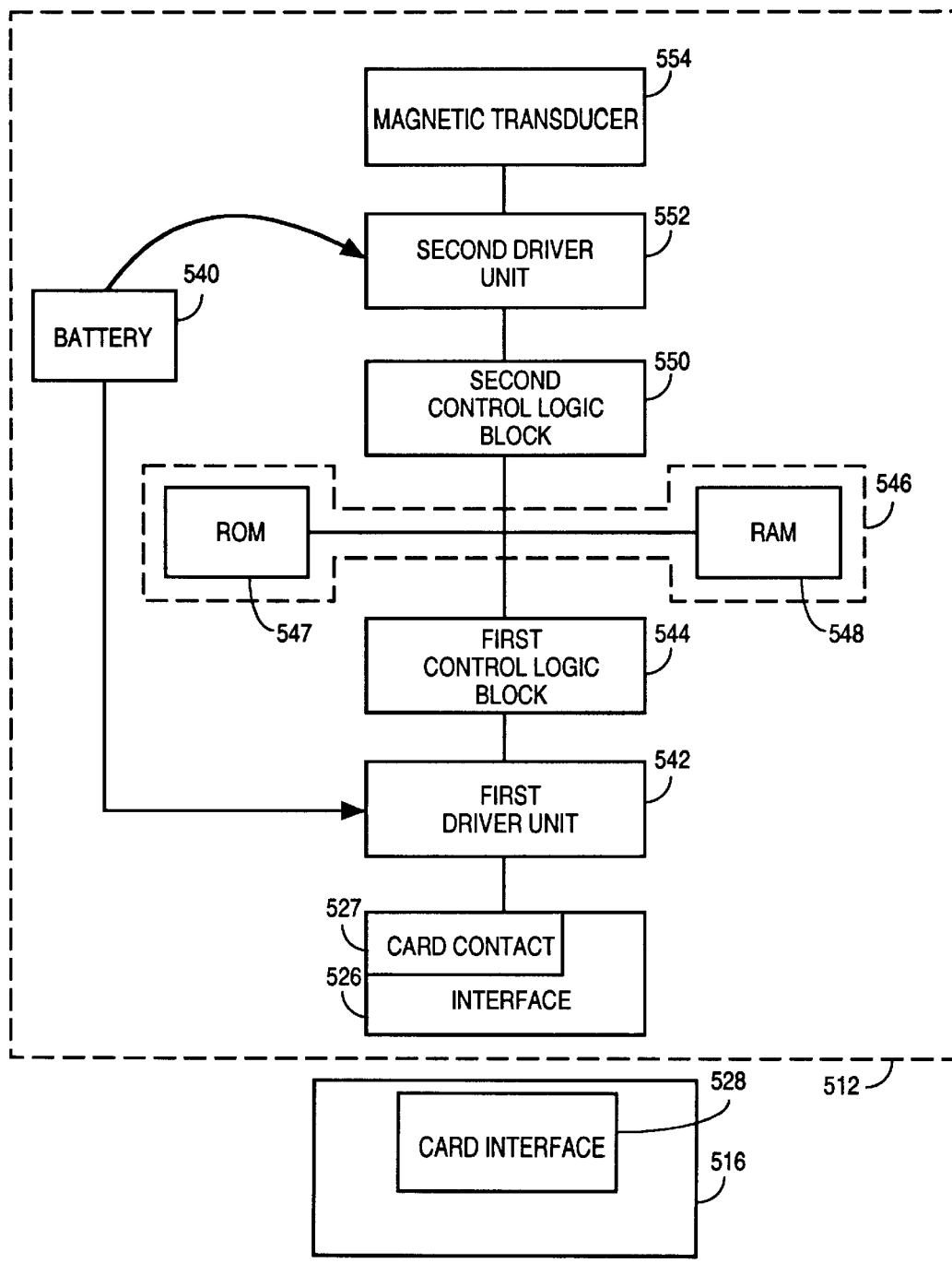
FIG. 5 is a schematic block diagram of the interface for transferring data of the device for transferring data according to the present invention.

FIG. 5 illustrates a block diagram 511 of the interface for transferring data between the data processing machine and the smart card. This interface is included in the device for transferring data which is defined by the perimeter 512. This figure equally shows a smart card 516 having a card interface 528. Generally, the card interface will include standardized ISO 7816 contact pads. The contact pads (not shown) can be frictionally engaged with the card contact 527 positioned on the receiving surface 325 (not shown) defining the card recess or cavity 321 of FIG. 3. Once the smart card 516 is inserted into the card recess (not shown) and the contact pads of the card are engaged with the card contact 527, the contact pads of the smart card are electrically coupled to the card contact interface 526. The card contact interface 526 enables, thus, the transfer of data between the card 516 and the device for transferring data 512. A first driver unit 542, is connected to both card interface 526 and battery 540. The battery 540 positioned in the device for transferring data 512 provides power via driver unit 542 to the individual components of the device for transferring data 512, and to the smart card 516.

The driver can also include a functional block for converting a digital signal into an analog signal. The digital signal is supplied by card 516 to the first driver which in response converts the signal into an analog signal. The analog signal is sent via a first control logic block 544 to a magnetic transducer 554. The magnetic transducers converts the analog electronic signal into a magnetic signal. More about the magnetic transducer will be elaborated upon later in this section.

The first control logic, block, connected to driver 542, generally includes logic components and circuits which control the driver 542 and the transfer of information between the card 516 and the device for transferring data 512. The first control logic block may include a microprocessor. Alternatively, the microprocessor built in the smart card 516 could provide some of the functions that a microprocessor incorporated into the first control logic block 544 would otherwise provide. The first control logic block 544 is also connected to a memory device 546 (shown in dotted lines). Memory device 546 can include a ROM device 547 for storing code and a RAM device 548 for storing data to be transferred between the smart card and the data processing machine.

A second control logic block 550 is connected to the memory device 546 and also to the first control logic block 544. This second control logic block can either be a block independent of the first control logic block or can be part of a single logic block connected to the first driver unit 542, to second driver unit 503, and to memory 546. While this embodiment shows memory device 546, one can imagine that the transfer of data between the card 516 and the data processing machine (not shown) could be possible without using a memory device, such as memory 546, disposed in the device for transferring data 512. A similar implementation might be possible by utilizing memory space outside of the device for transferring data 512. Such memory could be the memory of the smart card 516, for example.

A second driver 552 can be connected to the second control logic block 550. The second driver 552 could fulfill several functions. One of these functions would be to provide power to the second control logic block 550 and to the magnetic transducer 554, which in this embodiment is connected to the driver 552. Another function provided by the driver 552 would be to convert analog signals generated by the magnetic transducer into digital signals readable by smart card 516. Yet another function, that driver 552 could provide, could be digital signal processing. Such digital signal processing could be used to provide filtering and enhancement of the digital representations of the analog signals generated by the magnetic transducer.

Furthermore, the device for transferring data includes a magnetic transducer 554 positioned within the area defined by the perimeter of aperture 317 of FIG. 3. One function performed by the magnetic transducer is converting analog signals received from the first driver into magnetic signals to be transmitted to the read/write unit of the data processing machine. Another function performed by the magnetic transducer is receiving magnetic signals from the read/write unit of the data storage machine and converting these signals into analog signals. The magnetic transducer, in part, serves the purpose of emulating the functionality of a magnetic removable storage unit. This is accomplished by sending and receiving magnetic signals compatible with the magnetic data, which the magnetic removable storage unit would otherwise store or record. Furthermore, the magnetic transducer converts data specific to the smart card into data specific to a removable storage unit, and vice versa. The magnetic transducers 554 could be made from a simple coil of wire or a more complex transducer with both a coil and a ferris core such as the one found in the disk drive's magnetic read/write head. Data is, thus, relayed between the smart card 516 and the read/write unit of the diskette/cassette unit via magnetic transducer 554

While the present invention has been particularly described with reference to the various figures and embodiments, it should be understood that these are for illustration only and should not be taken as limiting the scope of the invention. Many changes and modifications may be made to the invention, by one having ordinary skill in the art, without departing from the spirit and scope of the invention. Accordingly, all such variations and modifications are included within the intended scope of the present invention as defined by the following claims.

What is claimed is:

1. A device to transfer data between a data processing machine (DPM) and a smart card, said device comprising:

a housing insertable into a drive of said DPM, said drive configured to receive a removable storage unit and to transfer data to and from said removable storage unit, said housing having an outer surface with an opening and an inner surface defining a cavity to receive a smart card via said opening;

a circuit to transfer data between said DPM and said smart card; and a circuit to perform digital signal processing on said data.

2. The device of claim 1, said digital signal processing includes filtering of digital signals derived from said data.

3. The device of claim 1, said digital signal processing includes enhancement of digital signals derived from said data.

4. The device recited in claim 1, said recess comprises a receiving surface having a card interface to couple said smart card to said device.

5. The device recited in claim 4, said card interface comprises a card interface contact to engage a contact pad of said smart card.

6. The device recited in claim 5, said circuit to transfer data comprises a circuit to emulate said removable storage unit.

7. The device recited in claim 6, said circuit to emulate comprises a circuit to convert data specific to said smart card into data specific to said removable storage unit and to convert data specific to said removable storage unit into data specific to said smart card.

8. The device recited in claim 7, said circuit to convert comprises a magnetic transducer.

9. The device recited in claim 8, said magnetic transducer comprises a magnetic coil.

10. The device recited in claim 8, said housing further includes an aperture to pass therethrough magnetic signals between said data processing machine and said magnetic transducer.

11. The device recited in claim 10, said circuit to transfer data comprises first and second driver units coupled to said card interface.

12. The device recited in claim 11, said circuit to transfer data further comprises first and second control logic units coupled, respectively, to said first and second driver units.

13. The device recited in claim 12, said circuit to transfer data further comprises a memory device coupled to said first and second control logic units.

14. The device recited in claim 13, further comprising a battery to provide energy via said first an second driver units, to said device to transfer data.

15. The device recited in claim 14, said housing further has a surface having an aperture, said device further including a spindle protruding through said aperture, said spindle being rotatably mounted in said housing.

16. The device recited in claim 15 wherein said housing further includes a magnetic disk radially expanding from said spindle.

17. A device to transfer data between a data processing machine and a smart card, said data processing machine having a drive to receive a removable storage unit and to read and write data to and from said removable storage unit, said device, comprising:

a housing insertable into said drive, said housing having a top surface, a side surface with an opening, and an inner surface defining a cavity for receiving a smart card via said opening;

means, disposed within said housing, for transferring data between said data processing machine and said smart card; and means, disposed within said housing, for performing digital signal processing on said data.

18. A data transfer assembly to transfer data between a data processing machine and a smart card, said data processing machine having a drive to receive a removable storage unit and to read and write data to and from said removable storage unit, said assembly comprising:

a smart card; and a housing insertable into said drive, said housing having a recess to receive a smart card and to support said smart card when said housing is inserted into said drive, said housing further including a circuit to transfer data between said data processing machine and said smart card; and a circuit to perform digital signal processing on said data.

19. A method for transferring data between a smart card and a data processing machine said method comprising the following steps:

providing a casing insertable into a drive of said data processing machine;

providing a recess into said casing for receiving and supporting a smart card;

providing an interface, onto said casing, for exchanging data between a smart card and said data processing machine;

inserting a smart card into said recess of said casing;

inserting said casing into a drive of said data processing machine;

generating a drive read or a drive write signal;

responsive to said drive read or drive write signal accessing said smart card via said drive; and performing by means within said casing signal data processing on said data.

20. A system comprising:

a memory;

a processor coupled to said memory;

a drive to receive a removable storage unit and to exchange data with the removable storage unit, the drive being coupled to the processor;

a housing insertable into said drive, said housing having a recess to receive a smart card and to support said smart card when said housing is inserted into said drive, said housing further having, a circuit to transfer data between said data processing machine and said smart card; and a circuit to perform signal processing on said data.

* * * * *

UNITED STATES PATENT AND TRADEMARK OFFICE
CERTIFICATE OF CORRECTION

PATENT NO.   : 5,936,226
DATED        : August 10, 1999
INVENTOR(S)  : Aucsmith

It is certified that error appears in the above-identified patent and that said Letters Patent is hereby corrected as shown below:

Column 1,
Line 58, delete "as".

Column 5,
Line 6, delete "parameter" and insert -- parimeter --.

Column 8,
Line 43, delete "by means within said casing".

Signed and Sealed this

Twenty-fifth Day of March, 2003

JAMES E. ROGAN
*Director of the United States Patent and Trademark Office*